(12) United States Patent
Berke et al.

(10) Patent No.: US 8,645,739 B2
(45) Date of Patent: Feb. 4, 2014

(54) SYSTEMS AND METHODS FOR POWER SUPPLY WARM SPARE AND PROGRAMMABLE LOAD SHARING

(75) Inventors: Stuart Allen Berke, Austin, TX (US); Mark Muccini, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 488 days.

(21) Appl. No.: 12/699,254

(22) Filed: Feb. 3, 2010

(65) Prior Publication Data

US 2011/0191618 A1    Aug. 4, 2011

(51) Int. Cl.
  *G06F 1/32*    (2006.01)
(52) U.S. Cl.
  USPC .......................... 713/324; 713/320; 713/323
(58) Field of Classification Search
  USPC .......................................... 713/300, 330, 340
  See application file for complete search history.

(56) References Cited

U.S. PATENT DOCUMENTS

| | | | | |
|---|---|---|---|---|
| 5,428,524 A | * | 6/1995 | Massie | 363/79 |
| 6,121,693 A | * | 9/2000 | Rock | 307/18 |
| 2006/0145899 A1 | * | 7/2006 | Markowski et al. | 341/78 |
| 2009/0307514 A1 | * | 12/2009 | Roberts et al. | 713/330 |
| 2010/0164292 A1 | * | 7/2010 | Freeman et al. | 307/80 |

* cited by examiner

*Primary Examiner* — Dennis M Butler
(74) *Attorney, Agent, or Firm* — Baker Botts L.L.P.

(57) ABSTRACT

A power supply system for an information handling system is disclosed. The power supply system includes power supply units electrically coupled via an output line. The power supply units are configured to supply an output voltage to the output line. Each power supply unit receives a feedback signal indicative of a voltage of the output line and a programmed voltage signal indicative of a supply voltage required for the output line. A standby power supply unit is configured to transition between a standby mode and an active mode based, at least in part, on the feedback signal and the programmed voltage signal. Power supply units are configured to transition to a load sharing mode where the power supply units cooperatively supply an output voltage to the output line. The transitioning is based, at least in part, on the feedback signal and the programmed voltage signal.

19 Claims, 4 Drawing Sheets

SYSTEMS AND METHODS FOR POWER SUPPLY WARM SPARE AND PROGRAMMABLE LOAD SHARING

TECHNICAL FIELD

The present disclosure relates generally to information handling systems and, more particularly, to systems and methods for power supply warm spare and programmable load sharing.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Information handling systems, such as servers, may include more than one power supply unit (PSU). To meet high availability requirements, servers may deploy redundant PSUs such that, if a PSU fails, the remaining PSU(s) are able to provide enough power to continue system operation. In most cases, the redundant PSUs are hot swappable, allowing replacement without disruption to system operation. A typical redundancy mode for mainstream servers may be characterized as "1+1." In that mode, a single PSU is able to supply enough power to supply the required power, while an identical PSU is provided for redundancy. Common practice has been to enable both PSUs to share the output load, with output rails "ORed" together via diodes or transistors, for example. In the general case, redundancy may be denoted as "M+N," where M is the number of enabled PSUs required to meet a given system's power requirements, and N is the number of redundant PSUs available for handling failures.

PSUs require power for their own internal operation (commonly called "housekeeping"), typically on the order of Watts (W). Their basic power efficiency characteristics are such that a PSU is typically optimized for loads of approximately 50-100% of the PSU's maximum load rating, while efficiencies at lower loads are relatively poor. When multiple PSUs are enabled in parallel to support redundancy or loads greater than a single PSU can support, each PSU may end up running at a poor (e.g., less than 20%), or a sub-optimal (e.g., 20-40%), point. Thus, for power efficiency, it is desirable to turn off the redundant PSUs until an operational PSU fails. However, the challenges of that approach include ramping up the redundant PSU quickly and orderly enough in order to keep the system rails within the valid operating range.

SUMMARY

In one aspect, a power supply system for an information handling system is disclosed. The power supply system includes one or more power supply units electrically coupled to at least one standby power supply unit via an output line. Each power supply unit is configured to supply an output voltage to the output line. Each power supply unit receives a feedback signal indicative of a voltage of the output line and a programmed voltage signal indicative of a supply voltage required for the output line. The at least one standby power supply unit is configured to transition between a standby mode and an active mode based, at least in part, on the feedback signal and the programmed voltage signal. At least two of the power supply units are configured to transition to a load sharing mode where the power supply units cooperatively supply an output voltage to the output line. The transitioning is based, at least in part, on the feedback signal and the programmed voltage signal.

In another aspect, a power supply system with programmable and tunable operating modes is disclosed. The power supply system includes a plurality of power supply units electrically coupled to an output line. The power supply units include programmable threshold logic and configured to: receive a programmed voltage signal indicative of a supply voltage required by one or more components in an information handling system; and transition to a load sharing mode where the power supply units cooperatively supply an output voltage to the output line, where the transitioning is based, at least in part, on the programmable threshold logic and the programmed voltage signal. At least one of the power supply units is further configured to transition between a standby mode and an active mode based, at least in part, on the programmable threshold logic.

In another aspect, a method for providing a power supply system with warm spare and programmable load sharing capabilities for an information handling system is disclosed. The method includes providing one or more power supply units with an aggregate power rating exceeding a power draw of an information handling system. The method further includes providing at least one additional power supply unit. The method further includes electrically coupling the power supply units, the at least one additional power supply unit, and one or more components in an information handling system via an output line. The method further includes configuring power supply control logic to: receive a feedback signal indicative of a voltage of the output line; and select an operating mode based, at least in part, on the feedback signal and a threshold signal. The method further includes operating the power supply units in the selected operating mode.

Thus, the present disclosure provides systems and methods for power supply warm spare PSU capability and programmable load sharing. The systems and methods may use programmable voltage thresholds and heuristics to set voltage output points and thresholds for optimal efficiency, while allowing proportional load balancing between enabled supplies. Optimized programmable output rails and associated voltage comparator thresholds may be used, without requiring additional and/or dedicated signaling between the PSUs and/or the system board. In addition, the same techniques may be used to optimize efficiency even when multiple PSUs are enabled, based on programming output voltages and load sharing to shift individual PSU loads to optimal regions.

Other technical advantages will be apparent to those of ordinary skill in the art in view of the specification, claims and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

PSUs (power supply units) require power for their own internal operation on the order of Watts (W). Their basic power efficiency characteristics are such that a PSU is typically optimized for loads of approximately 50-100% of the PSU's maximum load rating, while efficiencies at lower loads are relatively poor. When multiple PSUs are enabled in parallel to support redundancy or loads greater than a single PSU can support, each PSU may end up running at a poor (e.g., less than 20%), or a sub-optimal (e.g., 20-40%), point.

Figure 1:
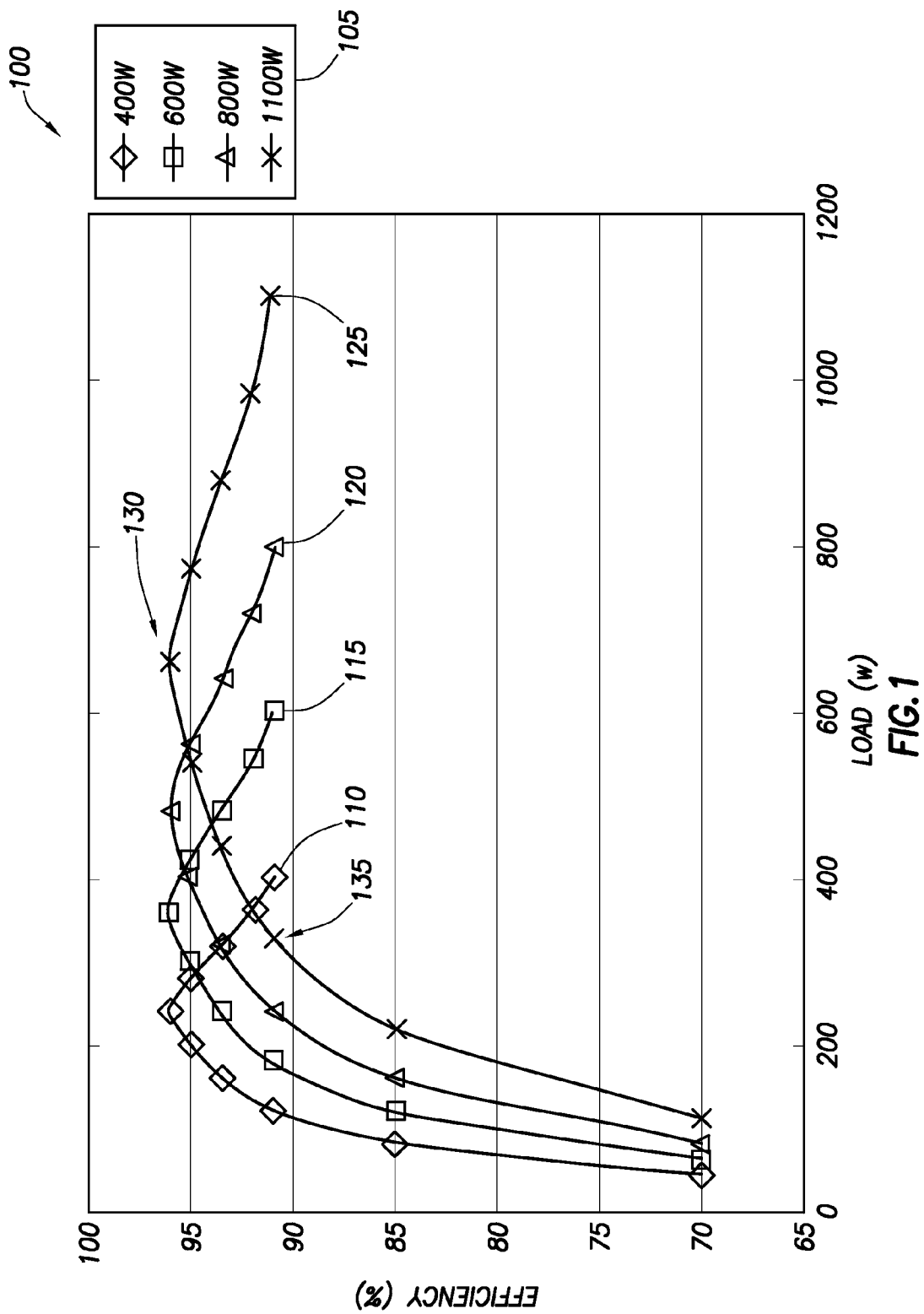
FIG. 1 illustrates a graph of exemplary power and efficiency data for several power supply units.

FIG. 1 illustrates a graph 100 of exemplary data showing representative power efficiency curves corresponding to several PSUs for servers. The vertical axis represents efficiency of the PSUs in as a percentage (%); the horizontal axis represents the load supplied by the PSUs in Watts. Element 105 is the legend for the graphical depictions. Curves 110, 115, 120 and 125 may correspond to PSUs with ratings of 400 W, 600 W, 800 W, and 1100 W, respectively. The power efficiency curves illustrate that the efficiency of a given PSU decreases toward the lower end of its power efficiency curve, regardless of the PSU output rating. Considering curve 125 as an example, an 1100-W PSU with a 750-W load operates at about 95% efficiency, as indicated at point 130. With a 375-W load, the same PSU would operate at about 91% efficiency, as indicated at point 135. Consequently, using two 1100-W PSUs in parallel, each contributing about 375 W to supply a 750-W load, would only operate at around 91% efficiency. Thus, a 4% savings (30 W) is realizable by powering the load with the first PSU (i.e., the primary PSU) and turning off the second PSU (i.e., the warm spare) until needed. More generally, this shows that to increase power efficiency it is desirable to turn off redundant PSUs until an operational PSU fails.

Figure 2:
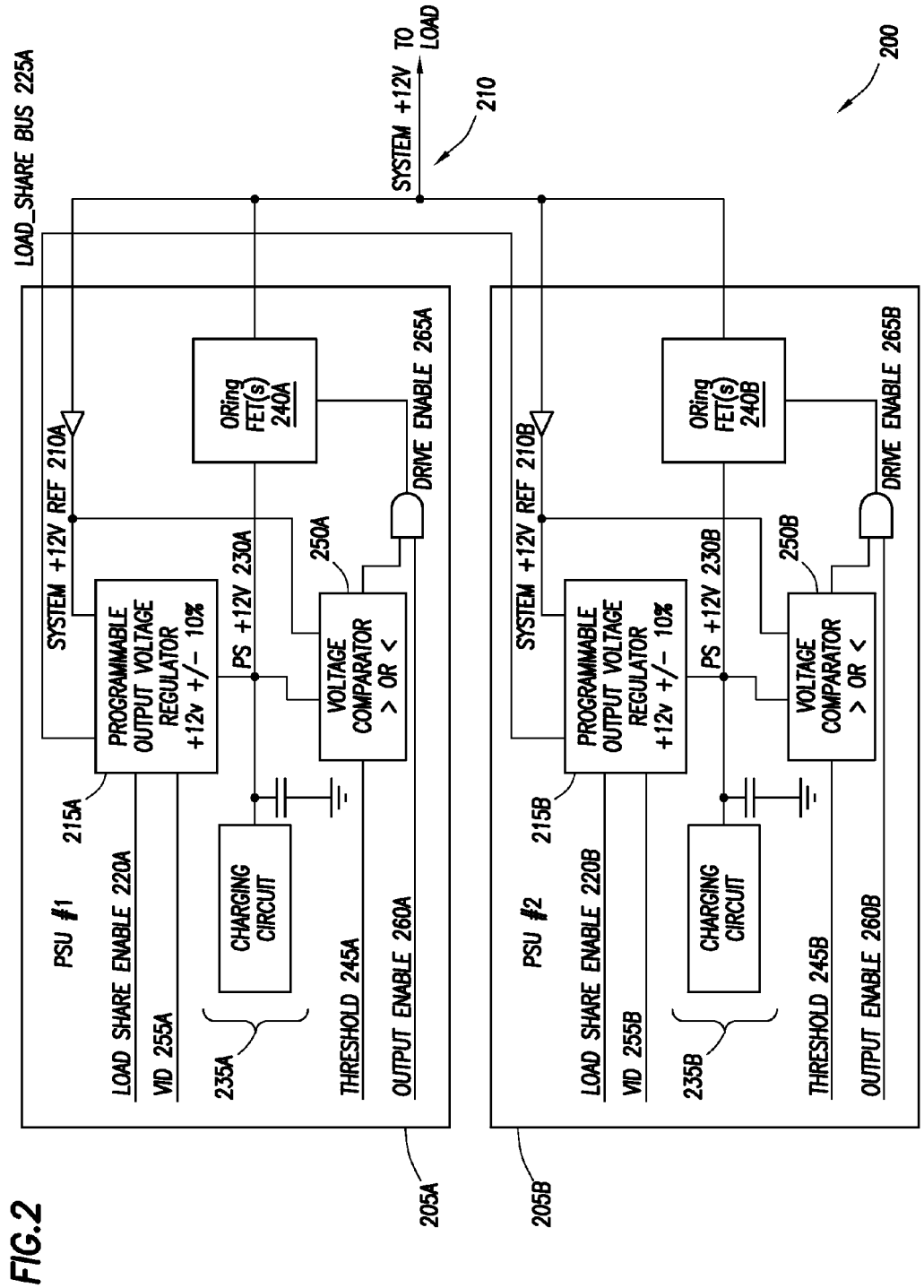
FIG. 2 is a block diagram showing a power supply warm spare and programmable load sharing system in accordance with certain embodiments of the present disclosure.

FIG. 2 illustrates an example block diagram 200 showing a power supply warm spare and programmable load sharing system according to certain embodiments of the present disclosure. Block diagram 200 includes a PSU 205A and a PSU 205B configured to supply an output voltage rail 210. As depicted, the output voltage rail 210 supplies a nominal +12 V (volts). It is to be understood that embodiments according to this disclosure support different numbers of output voltage rails, different numbers of PSUs in parallel, and various PSU input types (e.g., AC, DC, various numbers of phases, and various input voltages).

The PSU 205A may include a programmable output voltage regulator 215A. By way of example without limitation, the regulator 215A may support setting the output to approximately ±10% of nominal voltage. In the example depicted, approximately ±10% of nominal voltage is about 10.700 V to 13.200 V, in steps of approximately 10 mV via VIDs 255A. The VIDs may be a set of digital signals corresponding to voltages levels within a given voltage range. As known in the art, a voltage ID (VID) is a feature often implemented in computer systems. This feature allows the system power control function (which may be implemented in a CPU processor, system management controller, operating system, BIOS (Built-In Operating System), power management hardware or firmware, or any other suitable control function) to specify how many volts a voltage regulator should supply. Although VIDs are used in this example, any other method for allowing the voltage to be specified may be employed. The programmed voltage signal may be indicative of a supply voltage required by one or more components in an information handling system.

The PSUs 205A and 205B may be configured to cooperatively supply an output voltage based on current sensed at an output of each power supply unit. The load sharing may be based on selectable point-of-load (POL) or sense feed back from the system rail, such as SYSTEM +12V 210, or internal rails, such as PS +12V 230A. The current may be shared substantially equally between the PSUs, for example, in an average load sharing mode. The current may be shared unequally, for example, in a programmed load sharing mode.

A LOAD_SHARE_ENABLE signal 220A may direct the regulator 215A to regulate based on average current sharing via the LOAD_SHARE bus 225A (to/from other PSUs, such as PSU 205B). In addition or in the alternative, the regulator 215A may regulate based on proportional load sharing as determined by the VIDs in comparison to the PSU's system reference point, SYSTEM +12V REF 210A. In the latter case, current may be shared unequally by the enabled PSUs based on the relative voltages specified by their VIDs.

The internal voltage rail, PS +12V 230A, may be coupled to a capacitive hold-up 235A to maintain voltage during input power disruptions, hot plug cases, and failover cases. ORing FET(s) 240A, along with OUTPUT_ENABLE 260A and DRIVE ENABLE 265A, may enable the internal voltage of PS +12V 230A with respect to the bussed output voltage rail 210, SYSTEM +12V.

A voltage threshold function may be used to set the PSU configuration to current sharing mode (e.g., when the THRESHOLD 245A signal equals 0), or the actual threshold may be used to determine when the internal voltage rail, PS +12 V 230A, is enabled with respect to the SYSTEM +12V 210. THRESHOLD 245A may select the threshold of the voltage comparator 250A. For example without limitation, THRESHOLD 245A may be programmed from 0.1 to 1.5 V in 100-mV steps. If the THRESHOLD 245A signal equals 0, then the threshold input may be ignored. The programmed threshold may high enough to provide immunity to dynamic voltage fluctuations that are expected in a normally operating system, and low enough to guarantee that, upon primary PSU 205A failure, the warm spare PSU 205B may supply the current fast enough to ensure the output rail stays within regulation. As shown in FIG. 2, PSU 205B may include substantially similar elements and configuration as PSU 205A.

Certain embodiments of the present disclosure may support several useful operating modes. Redundancy may be denoted as "M+N," where M is the number of enabled PSUs required to meet system power requirements, and N is the number of redundant PSUs available to handle failures. For M+N redundancy, PSUs may be provided with a positive THRESHOLD, and may self-regulate according to their programmed VIDs. Those PSUs that have VIDs lower than the SYSTEM +12V 210 and deltas exceeding the THRESHOLD may automatically stop providing current to the system and enter warm spare mode. PSUs which have VIDs higher than the SYSTEM +12V 210, or deltas below the THRESHOLD, may source current proportionally to the observed delta. Setting THRESHOLD to 0 may support redundant PSU average load share (with LOAD_SHARE_ENABLE asserted) or programmable load sharing in which the PSU may source current proportionally to the observed delta between SYSTEM +12V 210 and VID. Power factor correction (PFC) may be enabled only when the PSU outputs are enabled. Shown in Table 1 is a summary of corresponding inputs and outputs in various conditions.

Figure 3:
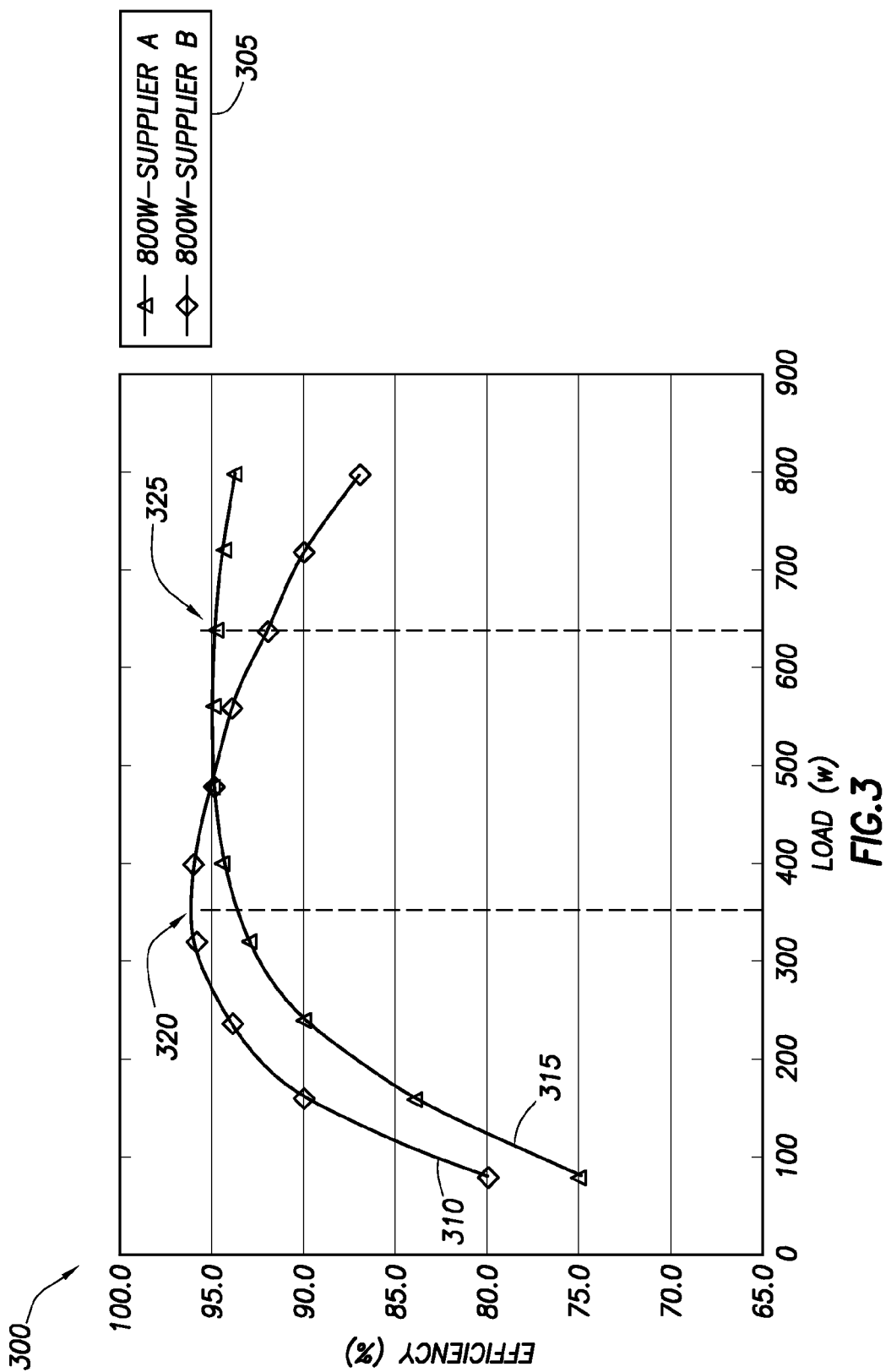
FIG. 3 is a graph of exemplary power and efficiency data corresponding to sets of power supply units.

FIG. 3 illustrates a graph 300 of exemplary data showing representative power efficiency curves corresponding to two sets of PSUs. The vertical axis represents efficiency of the PSUs in as a percentage (%); the horizontal axis represents the load supplied by the PSUs in Watts. Element 305 is the legend for the graphical depictions. Curves 310, 315 may correspond to Supplier A and Supplier B, respectively. Each of Suppliers A and B may be a PSU rated at 800 W. In alternative embodiments, each of Suppliers A and B may be a set of PSUs with an aggregate rating at 800 W. Curves 310, 315 illustrate a case where multiple suppliers have differing efficiency curves and optimization points due to design and/or component property differences. Considering curve 310 with a 350-W load indicated at point 320, Supplier B operates at greater efficiency relative to Supplier A. Accordingly, it is preferable to turn on Supplier B and leave Supplier A in warm spare mode for the 350-W load. Considering curve 315 with a 650-W load indicated at point 325, Supplier A operates at greater efficiency relative to Supplier B. Accordingly, it is preferable to turn on Supplier B and leave supplier A in warm spare mode for the 650-W load. For a 1000-W load, it is preferable to set load sharing such that Supplier A provides 650 W and Supplier B provides 350 W. This case is supported by the programmable load sharing capability by setting the VIDs appropriately, thereby providing optimal load sharing.

Figure 4:
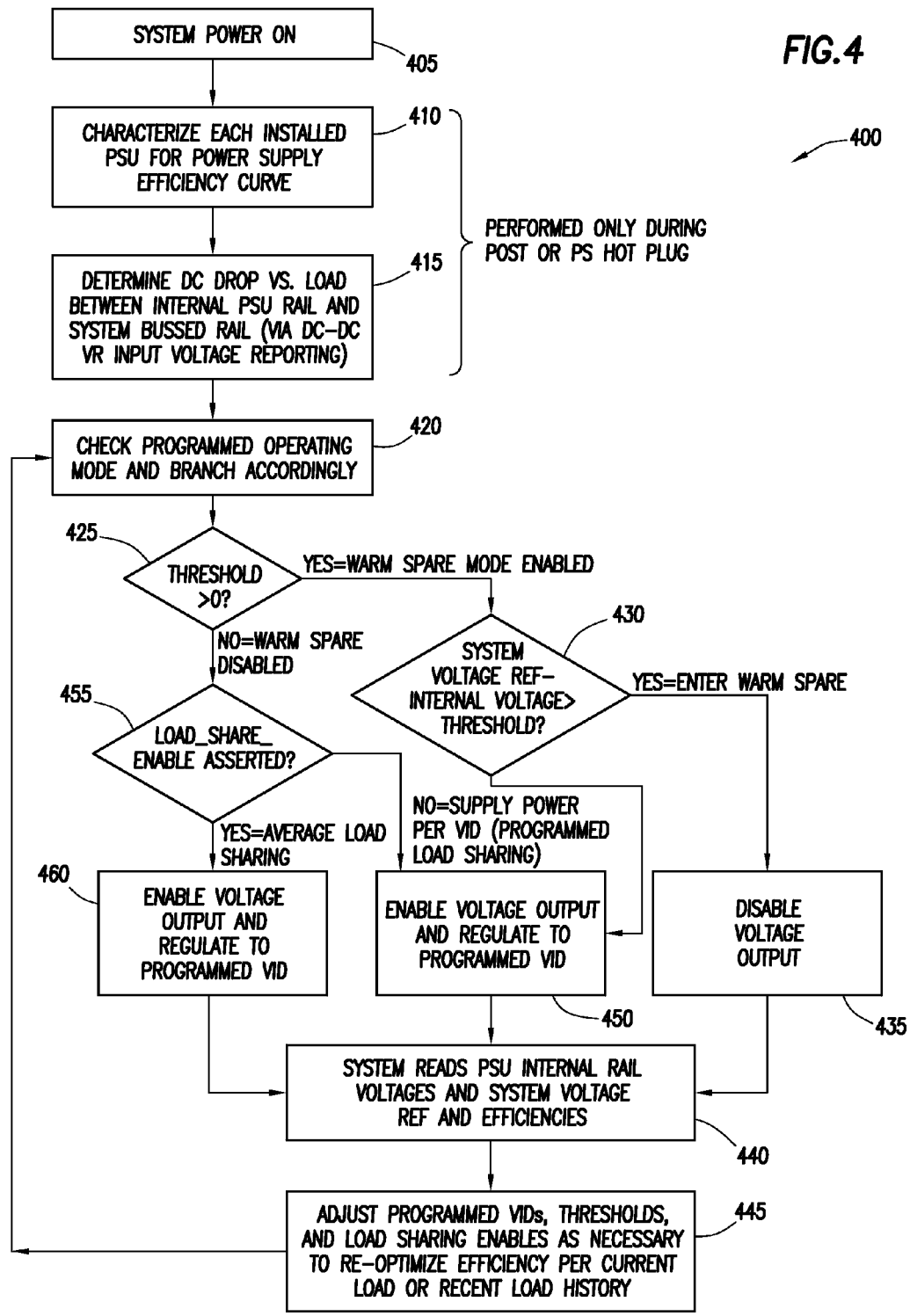
FIG. 4 is a process flow diagram illustrating basic initialization and dynamic adjustments of a power supply warm spare and programmable load sharing system in accordance with certain embodiments of the present disclosure.

FIG. 4 shows a flow chart 400 for one example of basic initialization and dynamic adjustments of a power supply warm spare and programmable load sharing system according to certain embodiments of the present disclosure. Optimal setting of VIDs, thresholds, and load sharing may be established by iteration, reading PSU efficiencies, output voltages, currents, enabled status, and computing threshold margins. Iteration may be done during POST (power-on self-test operations), run-time, specific customer calibration request, etc. Once the system determines that a failover has occurred via normal polling loop or alert, it can re-adjust accordingly the programmed VIDs, thresholds, and load sharing on the operative PSUs.

The system is powered on at step 405. At step 410, each installed PSU may be characterized based at least in part on a power supply efficiency curve and/or characteristic. At step 415, DC (direct current) voltage drop may be determined related to load between internal PSU rail and system bussed rail (via DC-DC voltage regulator input voltage reporting). Steps 410 and 415 may be performed only during POST or PS hot plug.

At step 420, a programmed operating mode may be checked. At step 425, it may be determined whether a threshold (e.g., the THRESHOLD signal) is greater than 0 V. A threshold greater than 0 V may indicate that warm spare mode is enabled, and the process continues to step 430. At step 430, it may be determined whether the difference between a sys-

TABLE 1

| | INPUTS | | | | OUTPUTS | | |
|---|---|---|---|---|---|---|---|
| OUTPUT_ENABLE | THRESH-OLD | LOAD_SHARE_ENABLE | SYSTEM +12 V REF-VID | | DRIVE_ENABLE | REGULATION POINT | PSU MODE |
| Deasserted | Don't Care | Don't Care | Don't Care | | Deasserted | None | Disabled |
| Asserted | =0 | Deasserted | Don't Care | | Asserted | SYSTEM +12 V REF | Programmed Load Sharing |
| Asserted | =0 | Asserted | Don't Care | | Asserted | SYSTEM +12 V REF | Average Load Sharing |
| Asserted | >0 | Don't Care | Positive & >Threshold | | Deasserted | VID | Warm Spare (Standby) |
| Asserted | >0 | Don't Care | Positive & >Threshold | | Asserted | VID | Programmed Load Sharing |
| Asserted | >0 | Don't Care | Negative | | Asserted | VID | Programmed Load Sharing | tem reference voltage (e.g., SYSTEM +12V REF) and an internal voltage (e.g., PS +12V) is greater than a threshold voltage (e.g., THRESHOLD). If so, warm spare mode may be entered and voltage output may be disabled at step 435. At step 440, the system may read PSU internal rail voltages, the system reference voltage(s), and PSU efficiencies. At step 445, programmed VIDs, thresholds, and load sharing enables may be adjusted as necessary to re-optimize efficiency per the current load or recent load history. Thereafter, the process flow may return to step 420.

Referring to step 430, if the difference between a system reference voltage and an internal voltage is not greater than a threshold voltage, then programmed load sharing may be employed, and power may be supplied according to VID signals. At step 450, the voltage output may be enabled and regulated per the programmed VID signals before proceeding to step 440.

Referring to step 425, if the threshold is not greater than 0 V, then warm spare mode is not enabled, and the process continues to step 455. If the LOAD_SHARE_ENABLE is not asserted, the process continues to step 450. If it is asserted, then average load sharing may be implemented. The voltage output may be enabled and regulated per the programmed VID signals before proceeding to step 440.

Thus, the present disclosure provides systems and methods for power supply warm spare PSU capability and programmable load sharing. The systems and methods may use programmable voltage thresholds and heuristics to set voltage output points and thresholds for optimal efficiency, while allowing proportional load balancing between enabled supplies. Optimized programmable output rails and associated voltage comparator thresholds may be used, without requiring additional and/or dedicated signaling between the PSUs and/or the system board. In addition, the same techniques may be used to optimize efficiency even when multiple PSUs are enabled, based on programming output voltages and load sharing to shift individual PSU loads to optimal regions. Other technical advantages will be apparent to those of ordinary skill in the art in view of the specification, claims and drawings.

Although the present disclosure has been described in detail, it should be understood that various changes, substitutions, and alterations can be made hereto without departing from the spirit and the scope of the invention as defined by the appended claims. Various changes, substitutions, and alterations can be made to interfaces with multiple devices at one end and a single device at the other end without departing from the spirit and the scope of the invention.

What is claimed is:

1. A power supply system for an information handling system, the power supply system comprising:
   a plurality of power supply units electrically coupled via an output line, each power supply unit comprising:
   a first input line for receiving power from a power source,
   a second input line for receiving a feedback signal from the output line,
   an internal voltage rail,
   a load share bus for communication with the plurality of power supply units, and
   wherein each power supply unit is configured to supply an output voltage to the output line;
   wherein each power supply unit receives, over the second input line, a feedback signal indicative of a voltage of the output line and receives, over the load share bus, a programmed voltage signal indicative of a supply voltage required for the output line;
   wherein at least one of the plurality of power supply units is configured to enter a standby mode where:
   the first input line of the at least one power supply unit continues to receive power from a power source,
   the internal voltage rail of the at least one power supply unit is enabled, and
   an output voltage is not supplied to the output line of the at least one power supply unit;
   wherein at least one of the plurality of power supply units is configured to transition from the standby mode to an active mode by engaging the internal voltage rail within the at least one of the plurality of power supply units with the output line, wherein the transition from the standby mode to the active mode is based, at least in part, on the feedback signal and the programmed voltage signal;
   wherein at least two of the plurality of power supply units are configured to transition to a load sharing mode where the power supply units cooperatively supply an output voltage to the output line, wherein the transitioning is based, at least in part, on the feedback signal and the programmed voltage signal.

2. The power supply system of claim 1, wherein each power supply unit comprises a programmable voltage regulator.

3. The power supply system of claim 1, wherein the at least one of the power supply units is further configured to transition between the standby mode and the active mode based, at least in part, on an efficiency profile of each power supply unit, and wherein the at least two of the plurality of power supply units are further configured to transition to the load sharing mode based, at least in part, on the efficiency profile of each power supply unit.

4. The power supply system of claim 1, wherein each power supply is further configured to transition to an average load sharing mode where each power supply unit supplies substantially equal currents, when a voltage signal permitting average load sharing is received.

5. The power supply system of claim 1, wherein the plurality of power supply units are further configured to cooperatively supply the output voltage based, at least in part, on current sensed at an output of each power supply unit.

6. The power supply system of claim 1, wherein the plurality of power supply units are further configured to cooperatively supply the output voltage based, at least in part, on feedback from the output line.

7. The power supply system of claim 1, wherein the plurality of power supply units are further configured to cooperatively supply the output voltage based, at least in part, on feedback from an internal line.

8. The power supply system of claim 1, wherein the plurality of power supply units further comprise power factor correction logic that is enabled by a voltage signal permitting the power supply units to cooperatively supply the output voltage.

9. A power supply system with programmable and tunable operating modes, the power supply system comprising:
   a plurality of power supply units electrically coupled to an output line, each power supply unit comprising:
   a first input line for receiving power from a power source,
   a second input line for receiving a feedback signal from the output line,
   an internal voltage rail,
   a load share bus for communication with the plurality of power supply units, and programmable threshold logic configured to:
supply an output voltage to the output line;
receive, over the load share bus, a programmed voltage signal indicative of a supply voltage required by one or more components in an information handling system; and
transition to a load sharing mode where the power supply units cooperatively supply an output voltage to the output line, wherein the transitioning is based, at least in part, on the programmable threshold logic and the programmed voltage signal;
wherein at least one of the plurality of power supply units is configured to enter a standby mode where:
the first input line of the at least one power supply unit continues to receive power from a power source,
the internal voltage rail of the at least one power supply unit is enabled, and
an output voltage is not supplied to the output line of the at least one power supply unit;
wherein at least one of the power supply units is further configured to transition from the standby mode to an active mode by engaging the internal voltage rail within the at least one of the power supply units with the output line, wherein the transition from the standby mode to the active mode is based, at least in part, on the programmable threshold logic.

10. The power supply system of claim 9, wherein each power supply unit comprises a programmable voltage regulator.

11. The power supply system of claim 9, wherein the power supply units are further configured to transition to the load sharing mode based, at least in part, on the efficiency profile of each power supply unit, and wherein the at least one of the power supply units is further configured to transition between the standby mode and the active mode based, at least in part, on the efficiency profile of each power supply unit.

12. The power supply system of claim 9, wherein power supply units are further configured to cooperatively supply the output voltage based, at least in part, on current sensed at an output of each power supply unit.

13. The power supply system of claim 9, wherein the power supply units are further configured to cooperatively supply the output voltage based, at least in part, on feedback from the output line.

14. The power supply system of claim 9, wherein the power supply units are further configured to cooperatively supply the output voltage based, at least in part, on feedback from an internal line.

15. The power supply system of claim 9, wherein the power supply units further comprise power factor correction logic that is enabled by a voltage signal permitting the power supply units to cooperatively supply the output voltage.

16. A method for providing a power supply system with warm spare and programmable load sharing capabilities for an information handling system, the method comprising:
providing one or more power supply units with an aggregate power rating exceeding a power draw of an information handling system;
providing at least one additional power supply unit;
electrically coupling the one or more power supply units, the at least one additional power supply unit, and one or more components in an information handling system via an output line;
providing power supply control logic that:
receives, over a first input line, power from a power source;
receives, over a second input line, a feedback signal indicative of a voltage of the output line; and
selects between a pre-determined set of operating modes based, at least in part, on the feedback signal and a threshold signal, at least one of the pre-determined set of operating modes comprising a standby mode in which:
an internal voltage rail of at least one of the one or more power supply units is disengaged from the output line,
power from a power source continues to be received over the first input line of the at least one of the one or more power supply units,
the internal voltage rail of the at least one of the one or more power supply units is enabled,
an output voltage is not supplied to the output line of the at least one of the one or more power supply units;
operating the one or more power supply units and the at least one additional power supply unit in the selected operating mode.

17. The method of claim 16, wherein the selected operating mode is a load sharing mode where the one or more power supply units cooperatively supply an output voltage to the output line.

18. The method of claim 16, wherein the power supply control logic:
receives, over a load share bus, a programmed voltage signal indicative of a supply voltage required by the one or more components; and
selects an operating mode based, at least in part, on the feedback signal, the threshold signal, and the programmed voltage signal.

19. The method of claim 18, wherein the selected operating mode is a warm spare mode where the at least one additional power supply unit cooperates with the one or more power supply in supplying an output voltage to the output line.

* * * * *